J. W. WHITE.
TUBE WELDING MACHINE.
APPLICATION FILED AUG. 25, 1920.
1,415,848.
Patented May 9, 1922.
3 SHEETS—SHEET 1.
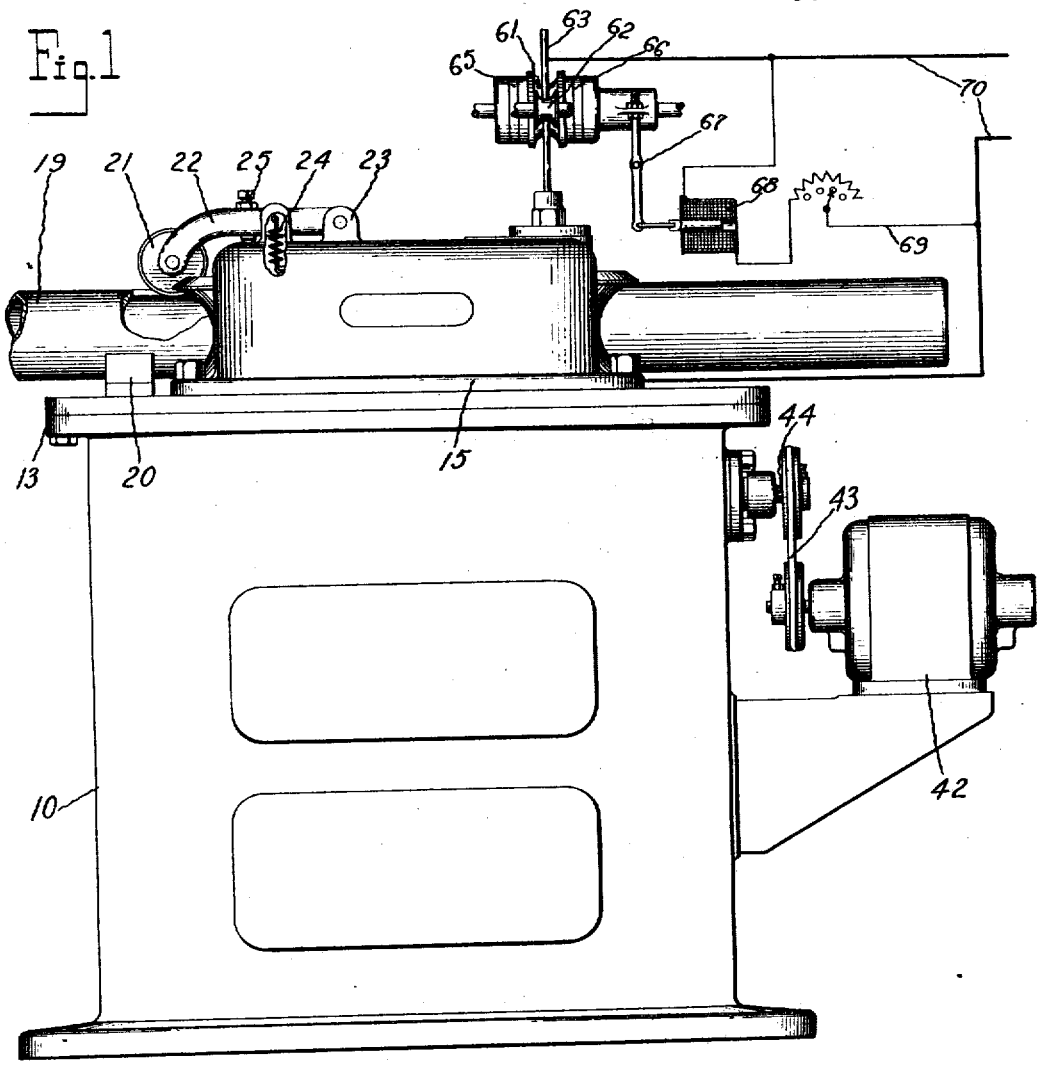
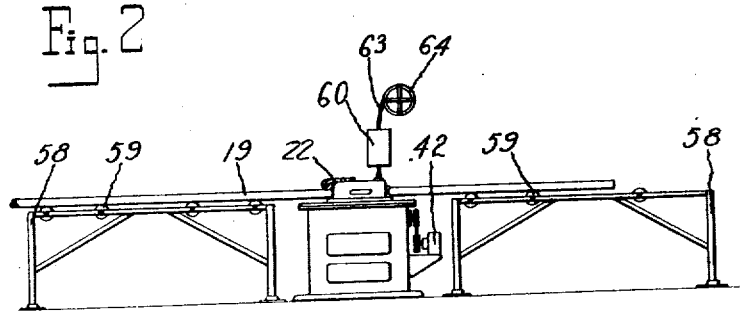
Inventor
John W. White
Attorneys
Blackmore, Spencer & Blunt

J. W. WHITE.
TUBE WELDING MACHINE.
APPLICATION FILED AUG. 25, 1920.

1,415,848.

Patented May 9, 1922.
3 SHEETS—SHEET 2.

Inventor
John W. White
Attorneys
Blackmore, Spear & Flint

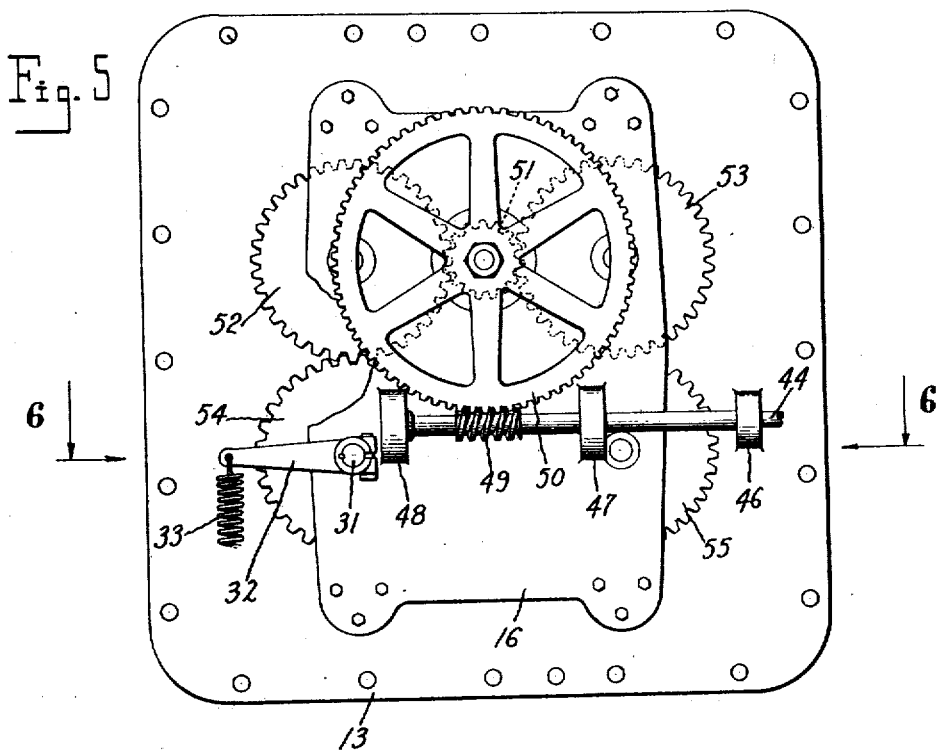
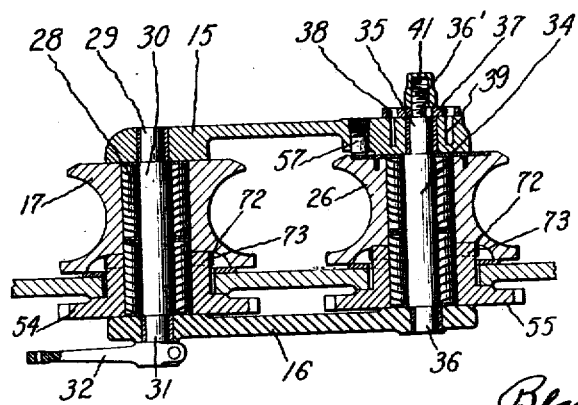

UNITED STATES PATENT OFFICE.

JOHN W. WHITE, OF DETROIT, MICHIGAN, ASSIGNOR TO GENERAL MOTORS CORPORATION, OF DETROIT, MICHIGAN, A CORPORATION OF DELAWARE.

TUBE-WELDING MACHINE.

1,415,848.      Specification of Letters Patent.      Patented May 9, 1922.

Application filed August 25, 1920. Serial No. 406,019.

*To all whom it may concern:*

Be it known that I, JOHN W. WHITE, a citizen of the United States, and a resident of Detroit, county of Wayne, and State of Michigan, have invented certain new and useful Improvements in Tube-Welding Machines, of which the following is a full, clear, concise, and exact description, such as will enable others skilled in the art to which the invention relates to make and use the same, reference being made therein to the accompanying drawings, which form a part of this specification.

The invention relates to tube-welding machines and more particularly to a machine whereby a blank comprising a skelp previously shaped to tubular form may be subjected to an electric welding operation along the joint between the meeting edges of the blank to thereby join such edges and produce a complete tube.

The primary object of the invention is to improve the construction of machines of this type and to render the welding operation substantially automatic.

A further object is to provide an improved blank feeding mechanism which shall be capable of ready and accurate adjustment to produce tubes of predetermined diameter, and wherein the feeding mechanism shall be capable of ready removal or replacement.

A further object is to provide, in combination with a tube feeding and directing means, an automatic electrode feeding device whereby metallic or other electrode material may be constantly supplied at the same rate at which it is fused or dissipated in the welding process.

With these and other objects in view as will appear more fully from the following description the invention consists of the features of novelty herein described and set forth in the claims together with such variations thereof as will be obvious to one skilled in the art to which the invention pertains.

Figure 3:
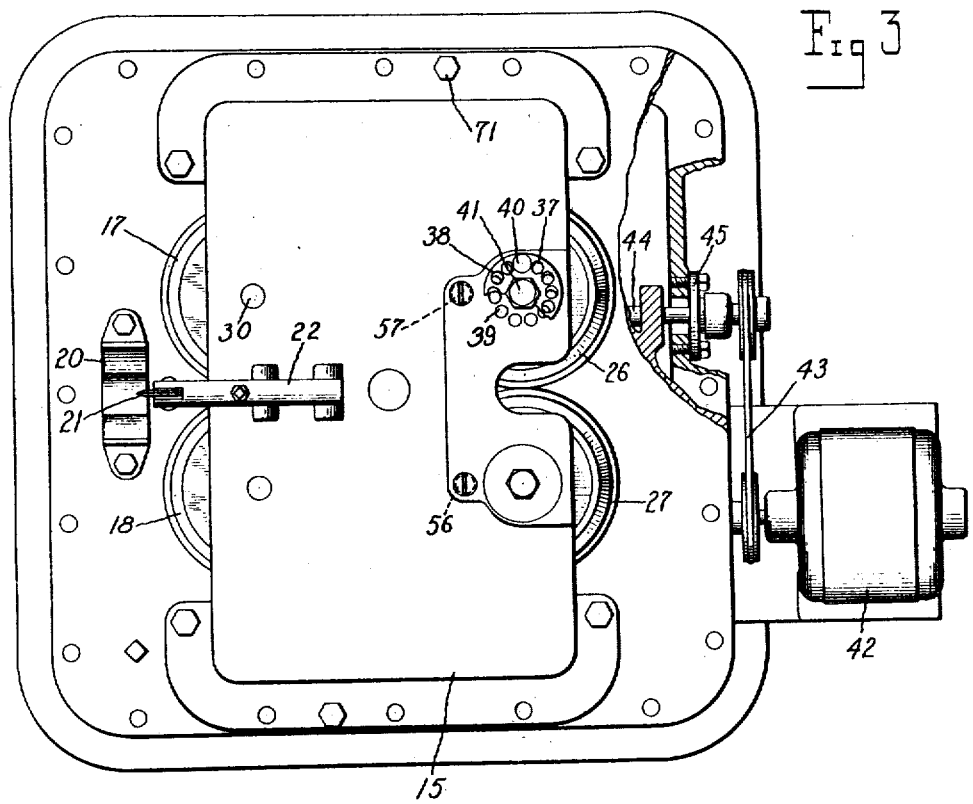
Figure 4:
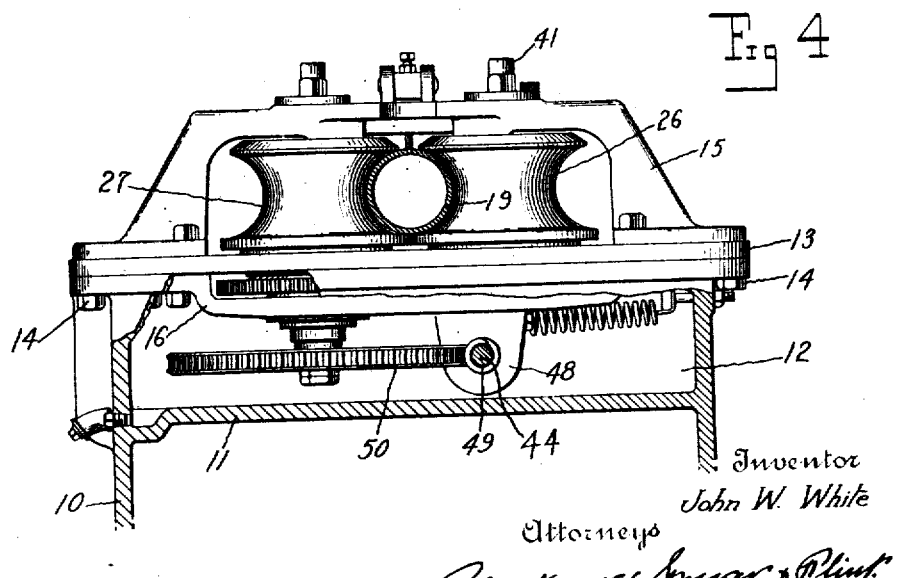

In the accompanying drawings illustrating one embodiment of my invention, Fig. 1 is a side elevation of the tube welding machine. Fig. 2 is an elevation showing the machine in assembled relation with the tube conveying devices to be used in connection therewith. Figs. 3 and 4 are respectively a top plan view and an end elevation of the blank feeding means, parts being broken away to show the driving connections. Fig. 5 is a bottom plan showing the driving means for the blank feeding devices, and Fig. 6 is a vertical section taken on line 6—6 of Fig. 5.

Referring to the drawings, 10 indicates a base structure which may be of any desired character adapted to support the blank feeding and tube welding mechanism. In the upper part of this base is the partition 11 which together with the side walls of the base forms a closed compartment 12 or reservoir adapted to contain a suitable supply of lubricant and in which the gearing for driving the blank feeding mechanism may be housed. The top of the compartment 12 is closed by a plate or table 13 which may be secured as by bolts 14 to the upper portion of the base member. Upon the upper side of this table 13 is secured a frame or housing 15 adapted to support upper bearings for the feeding and pressure rolls hereinafter described, and to the under side of the table is secured a frame 16 adapted to support the lower bearings for the said rolls.

In order to properly present the tube blank to the welding mechanism and to force together the edges to be joined I have provided two pairs of rolls, one pair, hereinafter designated as feed rolls, being adapted to seize the cylindrical blank and feed it forwardly, and the other designated as pressure rolls, being adapted not only to feed the blank but to force the edges together and hold them in suitable relation for the formation of the welded joint thereby determining the size of the finished tubing. Both pairs of rolls will be provided as shown with grooved peripheries adapted to fit the cylindrical or otherwise shaped exterior of the tube or blank.

The feed rolls 17, 18, are mounted on vertical axes above the table 13 in position to receive the incoming tube blank or formed skelp 19. In order to assist in entering the blank between the rolls a guide or rest 20 may be provided. It is essential that the blank be presented to the welding apparatus with the open side upward, and a guide roller 21 having a knife edge adapted to enter the slot between the edges of the skelp is provided to direct the joint properly to the welding head. The guide roller is shown as being journaled upon an arm 22 pivotally supported upon the frame 15 at 23. A spring 24 is arranged to force the roller into the slot in the tube blank and a set-screw 25 passing through the arm 22 and engaging with the frame 15 provides an adjustable means for limiting the downward movement of the roller. The pressure rolls 26, 27, are supported by the frame members 15, 16, in such relation to the rolls 17, 18 that the blank being fed through the last mentioned rolls will be properly presented to the pressure rolls.

Rolls 18 and 27 will be mounted preferably upon fixed bearings in the frame members 15, 16, which bearings may be of any suitable character, preferably of the anti-friction type. The roll 17 is journalled as shown in Fig. 6 with anti-friction bearings 28 upon the stud 29 provided with eccentric gudgeons 30, 31, supported in the frame members 15, 16. The lever 32 is secured to the gudgeon 31 and has attached to the end thereof the spring 33 suitably connected to a point of support on the table 13. The spring 33 tends to rotate the stud 29 in a direction which will bring the roll 17 into closer proximity to the roll 18 thereby providing a yieldable gripping means for the tube blank which is to be fed to the pressure rolls 26, 27. The pressure roll 26 is mounted in a manner similar to the roll 17 on a stud 34 provided with eccentric gudgeons 35, 36. The upper end of the gudgeon 35 is reduced and threaded, as shown at 36', and to the reduced portion is secured, so as to rotate with the stud, a collar 37. The collar is provided with a series of apertures 38 and the frame or housing 15 with a similar series of apertures 39 which may be one less in number than the apertures 38 thereby providing a vernier adjustment for the collar 37, a pin 40 being adapted to pass through any one of the apertures 38 and into any one of the apertures 39. A threaded cap 41 may be provided to clamp the collar in any adjusted position. The means disclosed provides for a very accurate adjustment of the distance between the pressure rolls 26, 27, thereby providing a means for sizing the finished tube with any desired degree of accuracy.

The feed and pressure rolls may be driven from the motor 42, a suitable driving connection 43 connecting the motor shaft to the main drive shaft 44 of the machine. An aperture for the drive shaft 44 in the side wall of the base 10 may be provided with a packing, as at 45, to prevent the escape of lubricant from reservoir 12. The drive shaft may be supported in suitable bearings 46, 47, 48, arranged upon the lower surface of the table 13 and the frame member 16. The screw 49 upon the shaft 44 communicates motion to a gear 50 suitably supported from the frame 16. A gear 51 concentric with the gear 50 and rigidly connected thereto is arranged in mesh with gears 52, 53, the former operating to rotate the feed roll 18 and the latter the pressure roll 27. Gears 54, 55, arranged to mesh respectively with gears 52, 53, are suitably journaled upon the studs 29, 34, respectively, and operate to drive the feed roll 17 and the pressure roll 26. The rolls are preferably arranged to be removable without affecting the gearing, suitable clutch devices 72, 73, being provided between the rolls and their respective driving gears.

It will be understood that the welding current will pass through the electrode and the blank, the machine itself forming a part of the circuit, the frame of the machine being connected in any suitable manner to one of the conductors for the welding current, as by the copper bolt 71. In order to insure good electrical connection between the machine frame and the work carbon brushes 56, 57, may be arranged to bear upon the ends of the pressure rolls. If desired copper slip rings may be embedded in the ends of the rolls on which the brushes may bear.

Suitable stands or tables 58, provided with any desired type of conveying means, such as the rollers 59, may be arranged both in front and rear of the welding machine proper in order to support and convey the formed skelps to the machine and the finished tubing therefrom. It will be readily understood that devices of an automatic or semi-automatic character may be employed if desired to render the services of an attendant less necessary.

The welding operation will be performed preferably by an automatic welding head 60, the position of which with reference to the blank feed mechanism is shown in Figs. 1 and 2. While the specific details of the welding head may vary to a considerable extent within the scope of the invention I prefer to employ an automatic head of the type set forth and claimed broadly in the co-pending application of E. S. Goodspeed, Serial Number 398,198, filed July 22, 1920, embodying means whereby a metal electrode may be fed to the work in such manner as to draw the arc automatically and maintain the arc of substantially constant length during the progress of the welding operation.

The details of a welding head of this type may vary widely. One form is illustrated in Figure 1, in which is shown a pair of feed rolls 61, 62, between which the electrode material 63 in the form of a wire or strip may be fed, the said material being supplied from a reel 64. The feed roll 61 may be constantly actuated by two driving devices 65, 66, which devices may be of the types disclosed in the application above referred to. The device 65, which may, as shown, include a friction clutch driven at a constant rate of speed, operates to drive the roll 61 in a direction to retract the electrode material from the work. The driving device 66, which may also include a friction clutch, is operated in a direction to cause the electrode material to be fed toward the work. The effect of this clutch device is variable by means of the lever 67 operated by solenoid 68 arranged in the circuit 69 in shunt with the arc which is supplied with current from the main line 70. It will be seen that the effect of the driving device 66 will vary with the resistance in the arc or at the point of contact between the electrode material and the work. The relation of the two driving devices will be so adjusted that when the current is first turned on the driving device 66 will operate to lower the electrode into contact with the arc whereupon, the resistance becoming practically zero and solenoid 68 operating to release the device 66, the driving device 65 will operate to withdraw the electrode, thereby drawing the arc. As the resistance in the arc increases however a greater amount of current will flow through the solenoid 68 thereby causing the driving device 66 to overcome the effect of the driving device 65 and cause the feeding of the electrode material to the arc at the desired rate.

It will be noted that the feeding mechanism may be removed as a unit from the base 10 and the reservoir 12 by merely removing the bolts 14, thus providing for ready inspection, repair or replacement. Also, by the removal of the top frame or housing 15, the rolls may be readily removed without in any way disarranging the remainder of the mechanism, and may be replaced by rolls of different size adapted to operate upon work of greater or less diameter. The peripheral contour of the rolls may, of course, be varied to accommodate work of other than cylindrical cross-section, which work may in some cases, as will be obvious, be other than tubular. Various other changes in details of construction may be made without departing from the spirit and scope of the invention and therefore I do not desire to be limited to the specific structure herein described.

I claim:

1. In tube welding apparatus the combination of a base having a lubricant reservoir in the upper portion thereof, a table secured to the base above said reservoir, a plurality of rolls mounted upon said table, and driving means for said rolls carried by said table and arranged in said reservoir.

2. In tube welding apparatus the combination of a base, a table secured thereto, a plurality of feed rolls mounted upon said table, a plurality of pressure rolls also mounted upon said table and driving means for said feed and pressure rolls supported in bearings carried by said table upon the under side thereof, said rolls, bearings and driving means being removable with said table as a unit.

3. In tube welding apparatus the combination of a table, feed rolls mounted thereon, pressure rolls also mounted thereon and arranged to receive work from said feed rolls, driving means for said rolls arranged beneath the table, and clutch connections between each of said rolls and said driving devices.

4. In tube welding apparatus the combination of a table, a plurality of feed rolls and a plurality of pressure rolls mounted upon said table, a frame or housing secured on said table bearing members for said rolls supported in said frame and said table, driving means for said rolls carried upon the under side of said table, and clutch devices between each of said rolls and said driving means, said rolls being removable upon the removal of said frame or housing.

5. In tube welding apparatus the combination of a pair of feed rolls, means for adjustably supporting one of said rolls comprising a stud supported eccentrically, actuating means connected to said stud for causing its rotation about the said eccentric supports, and yielding means operatively connected to said actuating means.

6. In tube welding apparatus a table, a frame, a pair of feed rolls, supports for said rolls mounted in said table and frame, one of said supports comprising a stud having eccentric gudgeons, a lever secured to said stud, and a spring acting through said lever to force said rolls toward each other.

7. In tube welding apparatus a pair of feed rolls, means for yieldingly forcing one of said rolls toward the other, a pair of pressure rolls arranged to receive work from said feed rolls, and means for adjusting the distance between said pressure rolls comprising a stud upon which one of said rolls is journaled, eccentric supporting means for said stud, and means for maintaining said supporting means in desired adjustment.

8. In tube welding apparatus a pair of pressure rolls, a stud upon which one of said rolls is journaled, said stud being provided with eccentric gudgeons, and means providing for a vernier adjustment of said stud.

9. In tube welding apparatus the combination of a table, a frame member mounted thereon, pressure rollers adapted to receive a tube blank therebetween, journals for said rollers supported in said table and frame, said frame member formed between said journals to permit access to said blank to weld the same adjacent to the point where the said rollers exert their greatest pressure.

10. In tube welding apparatus the combination of feed rolls adapted to receive a skelp bent to tubular form, a guide roll having a thin edge adapted to enter the slot between the edges of said skelp, a pivoted arm supporting said guide roll above said skelp, and adjustable means for limiting the movement of said guide roll in the downward direction.

11. In electric arc tube welding apparatus the combination of a frame, a plurality of work-receiving rolls rotatably supported by said frame, means for supporting an electrode in proximity to said rolls, and means for completing an electric circuit through said electrode and said work comprising conducting means supported by said frame and arranged to contact with the end surface of one of said rolls.

12. In arc welding apparatus the combination of feeding means including a plurality of rolls for causing work to move continuously, a welding head adapted to supply continuously metallic electrode material transversely to the line of travel of said work, an electric circuit including the electrode material, the work, and the rolls for producing an arc between said electrode and work, a circuit in shunt with said first-mentioned circuit and means including a clutch controlled by said shunt circuit for controlling the feed of the electrode material.

13. In tube welding apparatus the combination of pressure rolls adapted to force together the edges of a tube blank, means for feeding an electrode continuously toward the blank in proximity to the said edges adjacent to the point where the said edges are forced together by the said rolls, means for causing the blank to travel continuously past the said electrode feeding means, a circuit including the electrode and the blank for passing a current therethrough to cause an arc between the said electrode and blank, and a circuit in shunt with said first-mentioned circuit and including means for controlling the feeding of the electrode.

14. In arc welding apparatus the combination of a plurality of feed rolls, a plurality of pressure rolls adapted to receive work from said feed rolls, conveying means adapted to present work to said feed rolls, conveying means adapted to receive work from said pressure rolls, an automatic welding head arranged to feed a metallic electrode toward said work, a circuit including said electrode, said work and said pressure rolls and adapted to supply current to an arc between said electrode and work, a circuit in shunt with said first-mentioned circuit and a clutch in said welding head controlled by said shunt circuit and adapted to control the feed of the electrode.

15. In tube welding apparatus the combination of a pair of pressure rolls operative to feed between them a skelp and force together the edges thereof, and a welding head adapted to supply continuously metallic electrode material transversely to the direction of travel of said skelp and positioned to deliver such material adjacent to the point at which said rolls exert pressure to force the edges of said skelp together.

In testimony whereof I affix my signature.

JOHN W. WHITE.